(12) United States Patent
Sawada et al.

(10) Patent No.: US 9,279,563 B2
(45) Date of Patent: Mar. 8, 2016

(54) LAMP

(71) Applicant: KOITO MANUFACTURING CO., LTD., Tokyo (JP)

(72) Inventors: Shigeo Sawada, Shizuoka (JP); Hiroto Shimizu, Shizuoka (JP); Tomoya Nishihara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 6 days.

(21) Appl. No.: 14/060,940

(22) Filed: Oct. 23, 2013

(65) Prior Publication Data

US 2014/0119010 A1    May 1, 2014

(30) Foreign Application Priority Data

Oct. 30, 2012    (JP) .................................. 2012-238829

(51) Int. Cl.
| | |
|---|---|
| *F21V 7/09* | (2006.01) |
| *B64D 47/06* | (2006.01) |
| *F21V 7/06* | (2006.01) |
| *F21K 99/00* | (2010.01) |
| *F21S 8/10* | (2006.01) |

(52) U.S. Cl.
CPC . *F21V 7/06* (2013.01); *B64D 47/06* (2013.01); *F21K 9/50* (2013.01); *F21S 48/211* (2013.01); *F21S 48/215* (2013.01); *F21S 48/328* (2013.01)

(58) Field of Classification Search
CPC ............ F21V 7/06; F21K 9/50; F21S 48/211; F21S 48/215; F21S 48/328; B64D 47/06
USPC .................................................. 362/235–248
See application file for complete search history.

(56) References Cited

U.S. PATENT DOCUMENTS 8,123,377 B2 *    2/2012    Lundberg ............... B64D 47/06
                                                              362/243

FOREIGN PATENT DOCUMENTS

| JP | 2005032661 | 2/2005 |
| JP | 2007513488 | 5/2007 |
| KR | 1020060034793 | 4/2006 |
| WO | 2005061324 | 7/2005 |

OTHER PUBLICATIONS

Korean Office Action—Korean Application No. 10-2013-0125142 issued on May 30, 2014, citing JP 2005-032661 and KR 10-0813959.

* cited by examiner

*Primary Examiner* — Anh Mai
*Assistant Examiner* — Nathaniel Lee
(74) *Attorney, Agent, or Firm* — Abelman, Frayne & Schwab

(57) ABSTRACT

Provided is a lamp configured to control an irradiation angle. The lamp includes a light emitting unit that is provided with an LED and a reflector having a reflecting surface that reflects light from the LED. The reflecting surface of the reflector is formed to have a parabolic shape in a cross-section perpendicular to an optical axis of the LED. The reflecting surface of the reflector is formed to have an elliptical shape in a cross-section parallel to the optical axis of the LED so as to condense and diffuse reflected light beams in a forward direction.

10 Claims, 9 Drawing Sheets

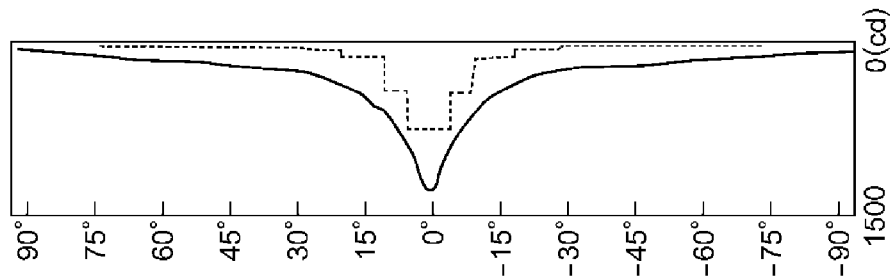
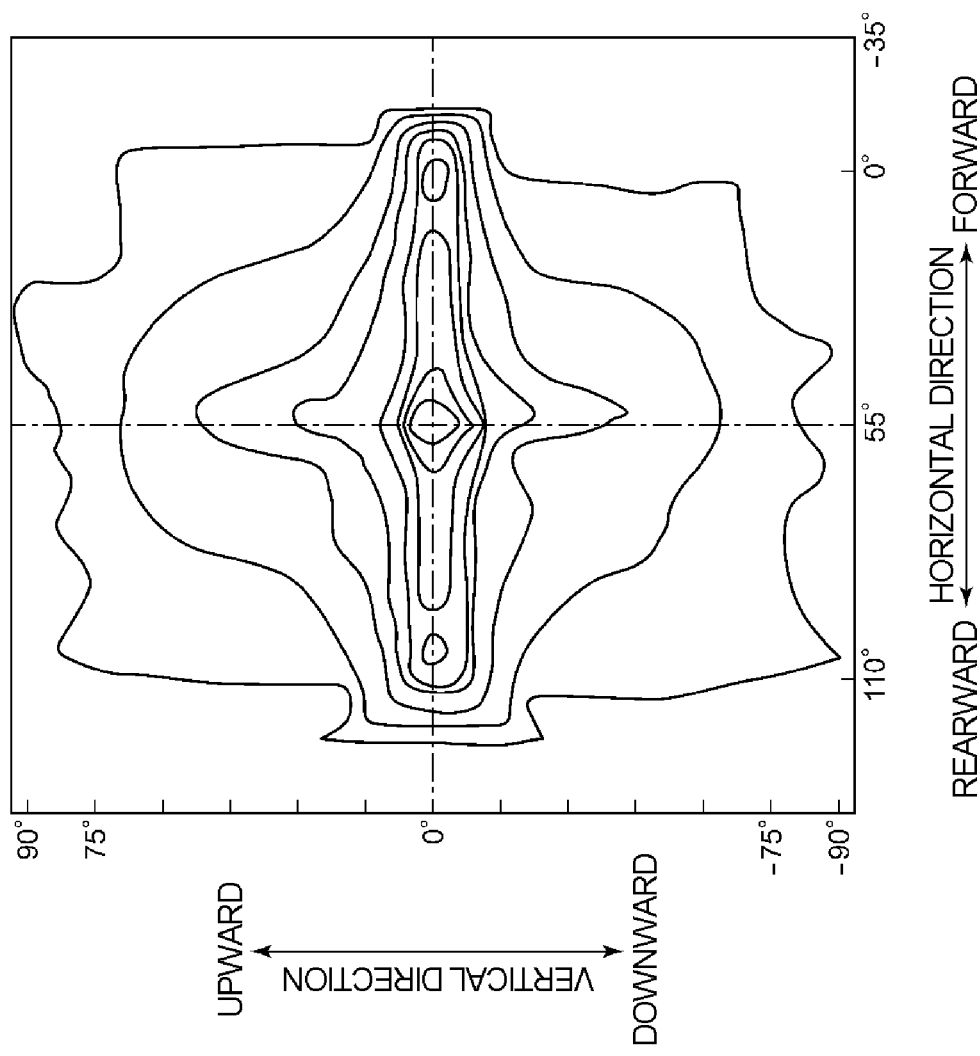
FIG.7A
FIG.7B

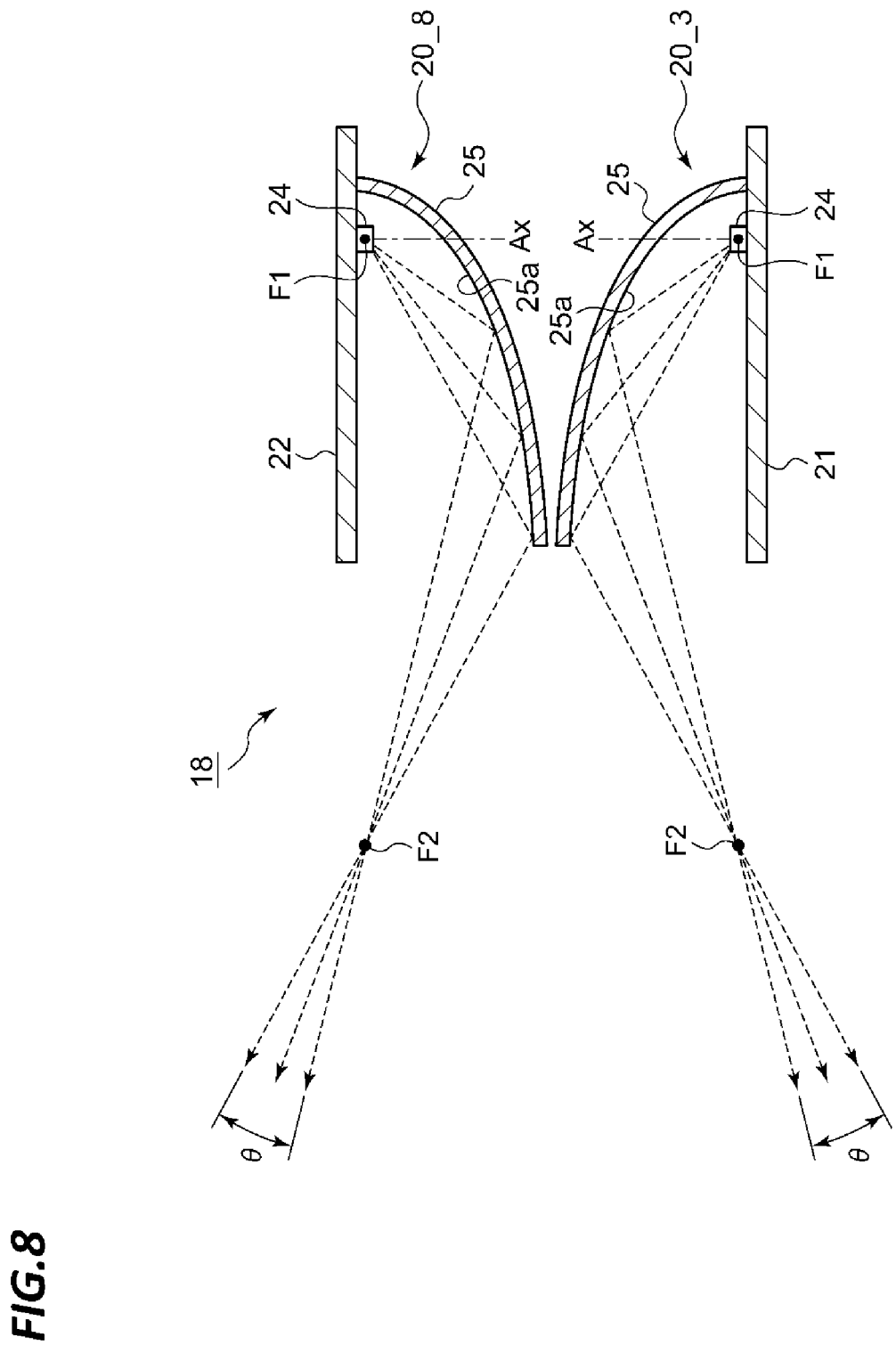

LAMP

CROSS REFERENCE TO RELATED APPLICATION

This application is based on and claims priority from Japanese Patent Application No. 2012-238829 filed on Oct. 30, 2012 with the Japan Patent Office and the disclosure of which is incorporated herein in its entirety by reference.

TECHNICAL FIELD

The present disclosure relates to a lamp, in particular a lamp used for an aircraft position light, as an example.

BACKGROUND

An aircraft is provided with position lights that indicate a travelling direction and a position so as to prevent a mutual collision. It is provided that an aircraft is equipped with a green position light at the end section of the right wing, a red position light at the end section of the left wing, and a white position light at the tail section thereof. While incandescent lamps have been used as light sources of the conventional position lights, light emitting diodes (LEDs) have been used recently. See, for example, Japanese Patent Laid-Open Publication No. 2007-513488.

For aircraft position lights, irradiation angles are prescribed. For example, an irradiation angle of 110° toward outside in relation to an axial line in the travelling direction is prescribed for both wing tip position lights and an irradiation angle of 140° is prescribed for a tail section position light. Therefore, in the position lights using LEDs, light beams emitted from the LEDs are required to be properly controlled to satisfy the prescribed irradiation angles.

The present disclosure has been made in consideration of the problems as described above and an object thereof is to provide a lamp which is capable of controlling an irradiation angle properly.

In order to achieve the object, a lamp according to an aspect of the present disclosure includes: a light emitting unit including a semiconductor light emitting element and a reflector which has a reflecting surface configured to reflect light from the semiconductor light emitting element. The reflecting surface of the reflector is formed to have a parabolic shape in a cross-section perpendicular to an optical axis of the semiconductor light emitting element. In addition, the reflecting surface is formed to have a condensing-diffusing shape in a cross-section parallel to the optical axis of the semiconductor light emitting element to condense and diffuse reflected light beams in a forward direction.

The lamp may be provided with two light emitting units which are disposed in a substantially horizontal direction thereof. The two light emitting units may be arranged such that the reflecting surfaces of the reflectors face each other.

The lamp may be provided with two light emitting units which are disposed in a substantially horizontal direction thereof. The two light emitting units may be arranged such that the reflecting surfaces of the reflectors of the light emitting units are positioned back to back.

The lamp may be provided with a plurality of light emitting units which are disposed in a substantially vertical direction thereof.

The condensing-diffusing shape may be an ellipse shape.

According to the present disclosure, a lamp capable of controlling an irradiation angle properly may be provided.

The above-described summary is illustration purposes only and does not intend to limit in any ways. In addition to the illustrative embodiments, examples, and features described above, additional embodiments, examples, and features will become apparent by referring to the drawings and the following detailed descriptions.

BRIEF DESCRIPTION OF THE DRAWINGS

FIGS. 7A and 7B are views illustrating light distribution characteristics of an aircraft position light according to an exemplary embodiment of the present disclosure.

FIG. 8 is a view illustrating an aircraft position light according to another exemplary embodiment of the present disclosure.

DETAILED DESCRIPTION

In the following detailed description, reference is made to the accompanying drawings which form a part hereof. The illustrative embodiments described in the detailed descriptions, drawings, and claims do not intend to limit. Other embodiments may be utilized and other modified examples may be made without departing from the spirit or scope of the subject matter presented here.

Hereinafter, a lamp according to an exemplary embodiment of the present disclosure will be described with reference to the drawings. The lamp according to the present exemplary embodiment is an aircraft position light.

Figure 1:
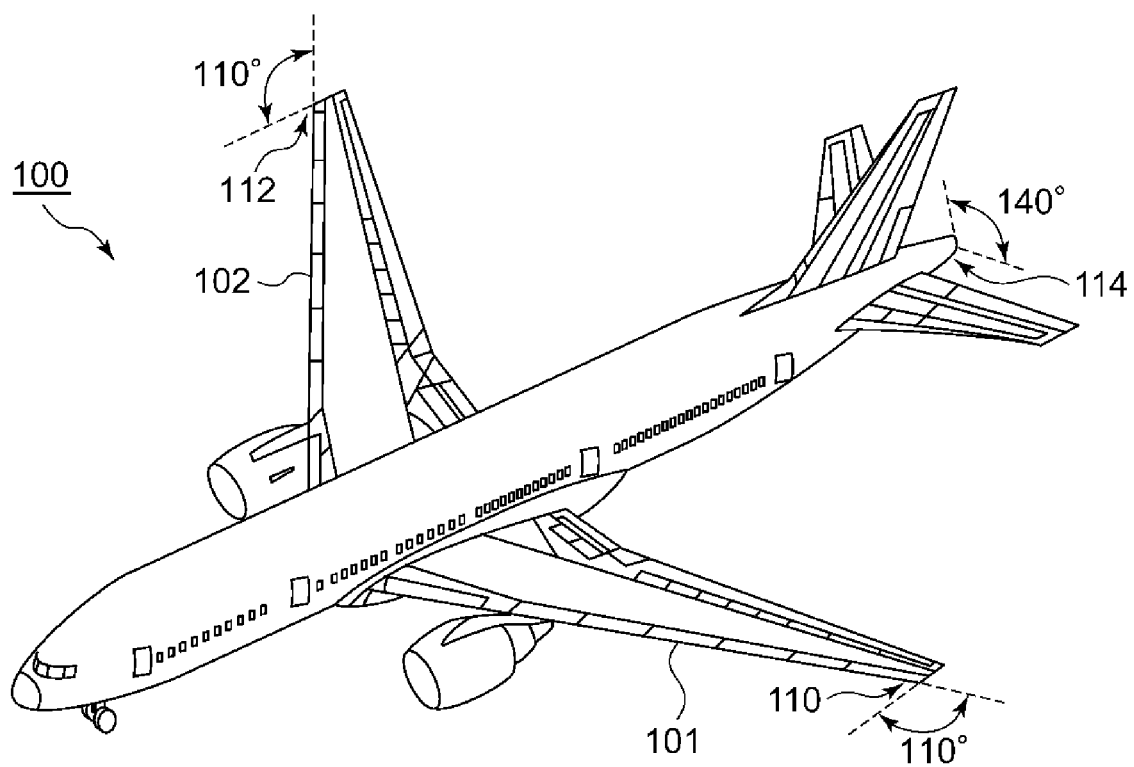
FIG. 1 is a schematic view illustrating an aircraft in its entirety where aircraft position lights are provided according to an exemplary embodiment of the present disclosure.

FIG. 1 is a schematic view illustrating an aircraft 100 in its entirety where aircraft position lights are provided according to an exemplary embodiment of the present disclosure. As illustrated in FIG. 1, a red position light 110 is provided at an end section of the left wing 101 of the aircraft 100, a green position light 112 is provided at an end section of the right wing 102, and a white position light 114 is provided at the tail section thereof. The irradiation angle of each of the red position light 110 and the green position light 112 is 110° toward outside with respect to an axis in the travelling direction of the aircraft 100 and the irradiation angle of the white position light 114 is 140° toward the rear side of the aircraft 100.

Figure 2:
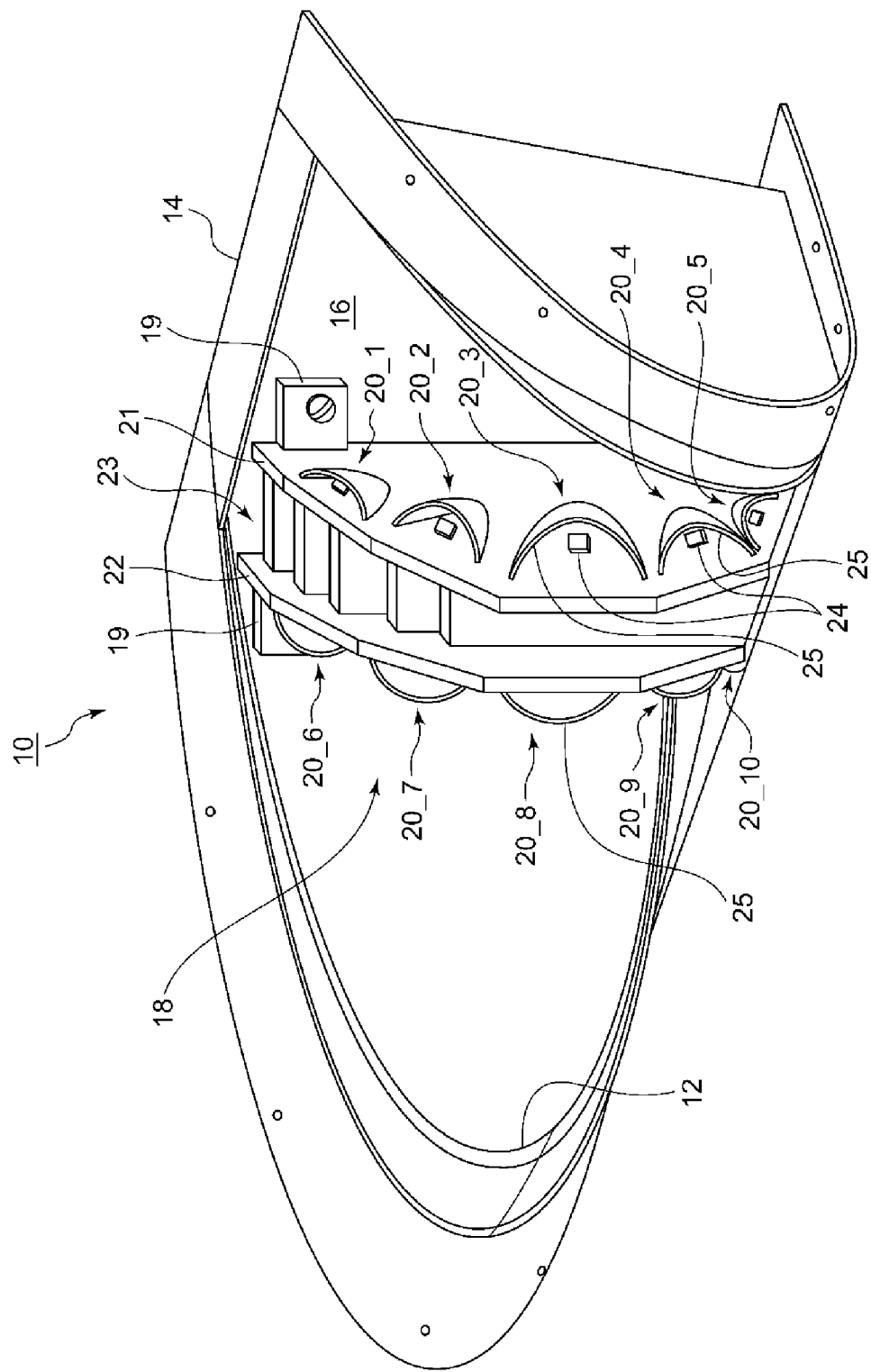
FIG. 2 is a perspective view of an aircraft position light according to an exemplary embodiment of the present disclosure.

FIG. 2 is a perspective view of an aircraft position light 10 according to an exemplary embodiment of the present disclosure. Here, the structure of the aircraft position light 10 will be described with reference to a red position light provided at the end section of the left wing as an example.

As illustrated in FIG. 2, the aircraft position light 10 includes a lamp body 14 having a concave portion which is opened toward the front side of the lamp and a front cover 12 which is transparent and configured to cover the opening of the lamp body 14. The lamp body 14 and the front cover 12 form a lamp chamber 16. The front cover 12 and the lamp body 14 are formed to follow the shape of the left wing.

A lamp unit 18 is provided in the lamp chamber 16. The lamp unit 18 is fixed to an inner wall of the lamp body 14 by fixation portions 19.

In the present exemplary embodiment, the lamp unit 18 includes ten light emitting units 20 (first to tenth light emitting units 20_1 to 20_10), a first board 21, a second board 22, and a heat sink 23. Each of the light emitting units 20 is provided with an LED 24 as a light source and a reflector 25 having a reflecting surface which reflects light emitted from the LED 24.

The first board 21 and the second board 22 are arranged in parallel to each other and the heat sink 23 is interposed therebetween. The first board 21 and the second board 22 are arranged vertically in the lamp chamber 16.

The first board 21 is provided with five light emitting units 20, i.e., the first to fifth light emitting units 20_1 to 20_5 on the side opposite to the heat sink 23. The first to fifth light emitting units 20_1 to 20_5 are arranged in a substantially vertical direction. Also, the second board 22 is provided with five light emitting units 20, i.e., the sixth to tenth light emitting units 20_6 to 20_10 on the side opposite to the heat sink 23. The sixth to tenth light emitting units 20_6 to 20_10 are also arranged in the substantially vertical direction. The first to fifth light emitting units 20_1 to 20_5 and the sixth to tenth light emitting units 20_6 to 20_10 are arranged symmetrically with respect to the middle plane between the first board 21 and the second board 22.

Figure 3:
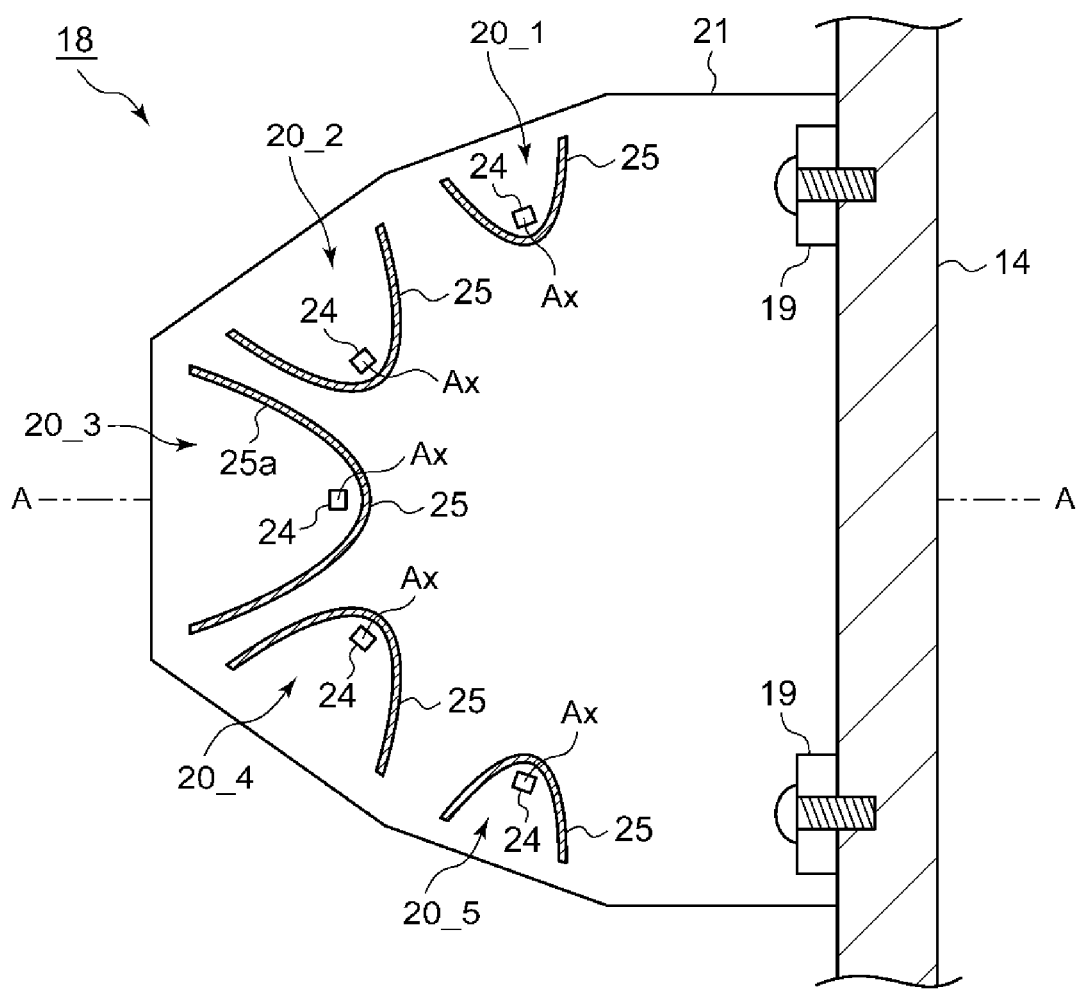
FIG. 3 is a schematic vertical cross-sectional view of a lamp unit.

FIG. 3 is a schematic vertical cross-sectional view of the lamp unit 18. The cross-sections of the first to fifth light emitting units 20_1 to 20_5 provided on the first board 21 are illustrated in FIG. 3 and the sixth to tenth light emitting units 20_6 to 20_10 also have the cross-sections which are the same as those of the first to fifth light emitting units 20_1 to 20_5, respectively.

As illustrated in FIG. 3, the third light emitting unit 20_3 located at the center of the five light emitting units on the first board 21 is disposed so as to emit light in the horizontal direction. The second light emitting unit 20_2 located at the upper side of the third light emitting unit 20_3 is disposed so as to emit light obliquely upwardly in relation to the horizontal direction and the first light emitting unit 20_1 located at the upper side of the second light emitting unit 20_2 is disposed so as to emit light more obliquely upwardly. Also, the fourth light emitting unit 20_4 located at the lower side of the third light emitting unit 20_3 is disposed so as to emit light obliquely downwardly in relation to the horizontal direction and the fifth light emitting unit 20_5 located at the lower side of the fourth light emitting unit 20_4 is disposed so as to emit light more obliquely downwardly.

The five light emitting units on the second board 22 are arranged in the same manner. That is, the eighth light emitting unit 20_8 located at the center of the five light emitting units on the second board 22 is disposed so as to emit light in the horizontal direction. The seventh light emitting unit 20_7 located at the upper side of the eighth light emitting unit 20_8 is disposed so as to emit light obliquely upwardly in relation to the horizontal direction and the sixth light emitting unit 20_6 located at the upper side of the seventh light emitting unit 20_7 is disposed so as to emit light more obliquely upwardly. Also, the ninth light emitting unit 20_9 located at the lower side of the eighth light emitting unit 20_8 is disposed so as to emit light obliquely downwardly in relation to the horizontal direction and the tenth light emitting unit 20_10 located at the lower side of the ninth light emitting unit 20_9 is disposed so as to emit light more obliquely downwardly.

Figure 4:
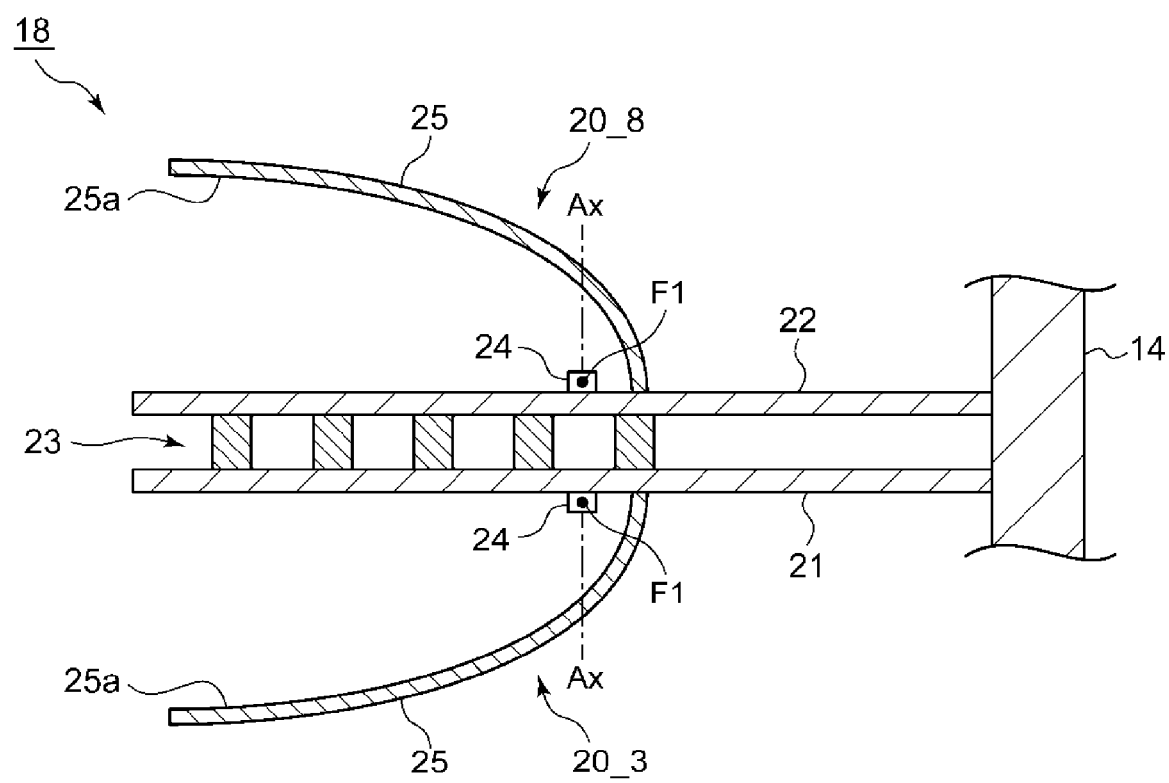
FIG. 4 is a schematic horizontal cross-sectional view of the lamp unit.

FIG. 4 is a schematic horizontal cross-sectional view of the lamp unit 18. FIG. 4 is a cross-sectional view taken along line A-A of the lamp unit 18 illustrated in FIG. 3 and illustrates the horizontal cross-sections of the third to eighth light emitting units 20_3 to 20_8.

As illustrated in FIG. 3 and FIG. 4, each of the light emitting units 20 is provided with an LED 24 on the first board 21 or the second board 22. The first board 21 and the second board 22 are formed with wirings that supply power to each LED 24 and mounting portions that are mounted with the LEDs 24.

Each of the light emitting units 20 is provided with a reflector 25 on the first board 21 or the second board 22 to surround the rear side, the lateral sides, and the upper side of the LED 24. In the present exemplary embodiment, a reflecting surface 25a of the reflector 25 is formed in an elliptical paraboloid shape. That is, the reflecting surface 25a of the reflector 25 is formed to have a parabolic shape in the cross-section perpendicular to the optical axis Ax of the LED 24 and an elliptical shape in the cross-section parallel to the optical axis Ax of the LED 24. Here, the optical axis Ax of the LED 24 is an axis perpendicular to the emitting surface of the LED 24.

As illustrated in FIG. 3, the reflecting surface 25a of each reflector 25 is formed to have a parabolic shape in the cross-section perpendicular to the optical axis Ax of the LED 24 and the optical axis Ax is located at the focus of the parabola. From the description, "the reflecting surface 25a has a parabolic shape in the cross-section perpendicular to the optical axis Ax," it is intended to mean that the reflecting surface 25a becomes a parabolic shape in any cross-section that are perpendicular to the optical axis Ax.

Also, as illustrated in FIG. 4, the reflecting surface 25a of each reflector 25 is formed to have an elliptical shape in a cross-section parallel to the optical axis Ax of the LED 24. Here, the term, "cross-section parallel to the optical axis Ax" refers to a plane parallel to a plane which includes the optical axis Ax and the symmetry axis of the parabola of the reflecting surface 25a in the cross-section perpendicular to the optical axis Ax (hereinafter, referred to as "central cross-section"). From the description, "the reflection surface 25a has an elliptical shape in a cross-section parallel to the optical axis Ax", it is intended to mean that the reflecting surface 25a becomes an elliptical shape in any cross-section parallel to the central cross-section. In the central cross-section illustrated in FIG. 4, the LEDs 24 are located at the first focuses F1 of the elliptical reflecting surfaces 25a, respectively.

As illustrated in FIG. 4, the third light emitting unit 20_3 and the eighth light emitting unit 20_8 are arranged such that the reflecting surfaces 25a of reflectors 25 face each other and the first board 21, the heat sink 23, and the second board 22 are interposed between the reflecting surfaces 25a. Likewise, the first and sixth light emitting units 20_1 and 20_6, the second and seventh light emitting units 20_2 and 20_7, the fourth and ninth light emitting units 20_4 and 20_9, and the fifth and tenth light emitting units 20_5 and 20_10 are arranged such that the reflecting surfaces 25a of the reflectors 25 face each other and the first board 21, the heat sink 23, and the second board 22 are interposed between the reflecting surfaces 25a.

Figure 5:
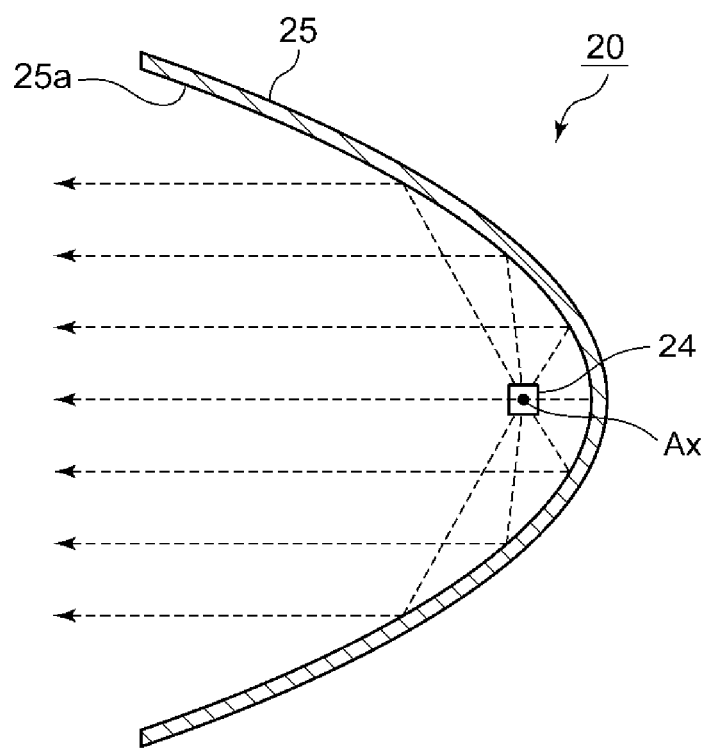
FIG. 5 is a view illustrating light emitted from a light emitting unit in a cross-section perpendicular to an optical axis of an LED.

Next, light emitted from the above-described light emitting unit will be described. FIG. 5 illustrates the light emitted from the light emitting unit in the cross-section perpendicular to the optical axis Ax of an LED 24. As described above, the reflecting surface 25a of the reflector 25 is formed to have a parabolic shape in the cross-section perpendicular to the optical axis Ax and the optical axis Ax of the LED 24 is located at a focus of the parabola. Therefore, the light from the LED 24 is reflected on the reflecting surface 25a as parallel beams and emitted to the outside.

Figure 6:
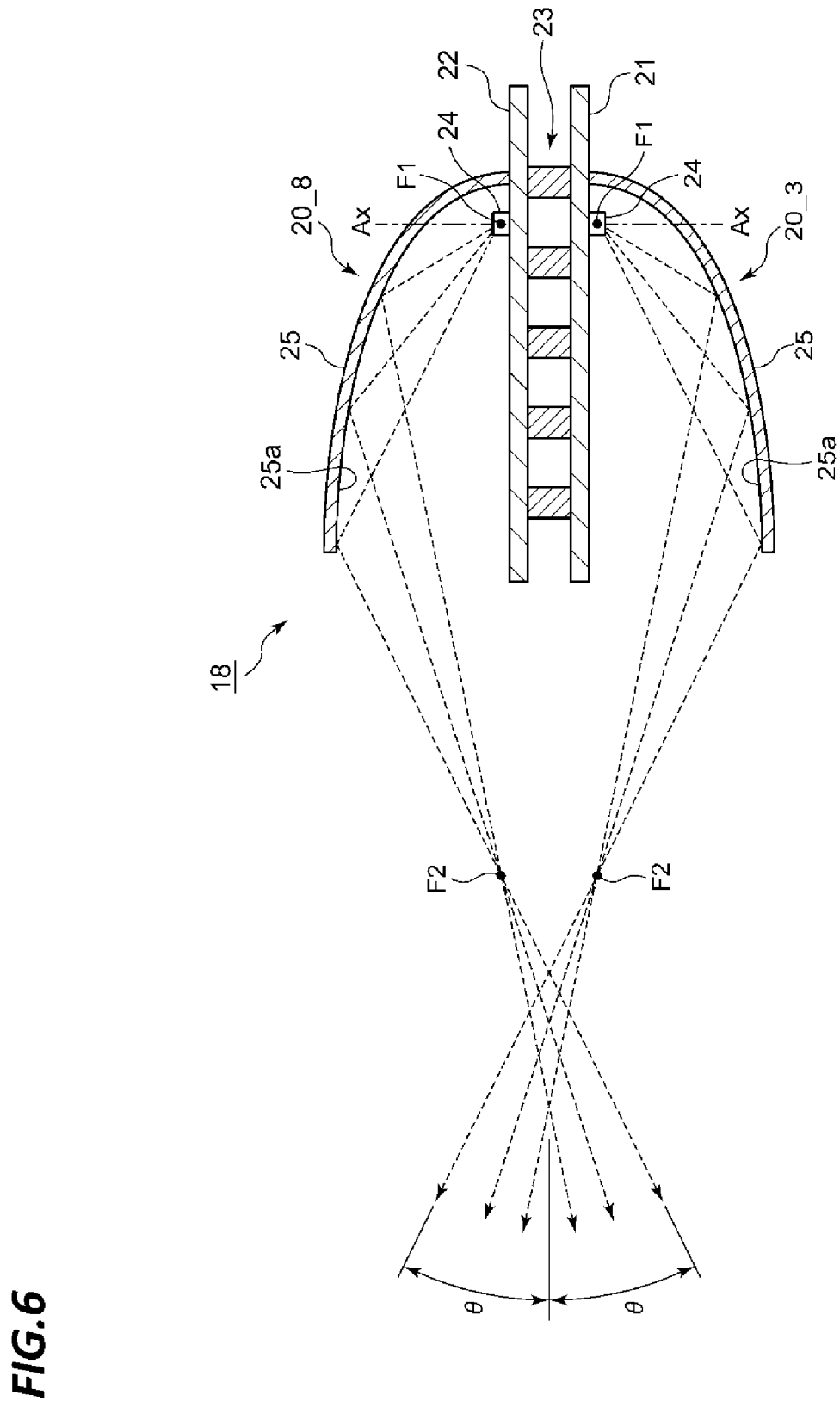
FIG. 6 is a view illustrating light emitted from two light emitting units in a cross-section parallel to an optical axis of an LED.

FIG. 6 illustrates light emitted from two light emitting units in the cross-section parallel to the optical axis Ax of LEDs 24. Here, the pair of the third and eighth light emitting units 20_3 and 20_8 will be described as an example. As described above, the reflecting surface 25a of the reflector 25 in each of the light emitting units 20 is formed to have an elliptical shape in the cross-section parallel to the optical axis Ax. Also, the LED 24 is located at the first focus F1 of the elliptical reflecting surface 25a in the central cross-section. Therefore, the light from the LED 24 is condensed to the second focus F2 first, and then diffused as illustrated in FIG. 6.

In the present exemplary embodiment, two light emitting units 20 are arranged such that the reflecting surfaces 25a of the reflectors 25 of the light emitting units 20 face each other. Therefore, when the elliptical shape of each reflecting surface 25a is designed such that the irradiation angle θ from one of the light emitting units 20 becomes 55°, a horizontal irradiation angle of total 110° may be obtained by combining the two light emitting units 20. The irradiation angle of each of the light emitting units 20 may be changed easily by changing the elliptical shape so that the locations of the first focus F1 and the second focus F2 are adjusted. For example, when the elliptical shape of each of the reflecting surface 25a is changed so that the distance between the first focus F1 and the second focus F2 is shortened, the irradiation angle θ of each of the light emitting units 20 may be increased. For example, when the elliptical shape of each of the reflecting surfaces 25a is designed such that the irradiation angle of each of the light emitting units 20 becomes 70°, a white position light provided at the tail section of an aircraft may be constituted.

As described above, according to the aircraft position light 10 of the present exemplary embodiment, when a light emitting unit 20 provided with a reflector 25 which has a reflecting surface 25a in an elliptical paraboloid is used, the irradiation angle of the horizontal direction may be properly controlled.

Also, each of the light emitting units 20 has a small irradiation angle in a cross-section perpendicular to the optical axis Ax of the LED 24 since emitted light becomes parallel beams. However, as in the aircraft position light 10 according to the present exemplary embodiment, when a plurality of light emitting units 20 are arranged in a substantially vertical direction while changing the emission directions thereof, the irradiation angle of the vertical direction may be increased.

FIGS. 7A and 7B illustrate light distribution characteristics of the aircraft position light 10 according to the present exemplary embodiment. FIG. 7A illustrates an equi-intensity curve of light of the aircraft position light 10. The solid line of FIG. 7B illustrates a light intensity of the aircraft position light 10 and the broken line of FIG. 7B illustrates a light intensity which is required as standards.

FIG. 8 is a view for describing the aircraft position light according to another exemplary embodiment of the present disclosure. As in FIG. 4, FIG. 8 illustrates a horizontal cross-section of the third and eighth light emitting units 20_3 and 20_8.

In the present exemplary embodiment, as illustrated in FIG. 8, the third and eighth light emitting units 20_3 and 20_8 are arranged such that the reflecting surfaces 25a of the reflectors 25 are positioned back to back. In the same manner, the first and sixth light emitting units 20_1 and 20_6, the second and seventh light emitting units 20_2 and 20_7, the fourth and ninth light emitting units 20_4 and 20_9, and the fifth and tenth light emitting units 20_5 and 20_10 are arranged such that the reflecting surfaces 25a of the reflectors 25 positioned back to back, respectively. A basic configuration of each of the light emitting units 20, that is, the shape of the reflecting surface 25a of the reflector 25 is the same as that of the above-described exemplary embodiment.

Also, in the present exemplary embodiment, the light from a LED 24 which is located at the first focus F1 in the cross-section parallel to the optical axis Ax of the LED 24 is condensed to the second focus F2 from the reflecting surface 25a and then diffused.

In the previous exemplary embodiment, when two light emitting units 20 are arranged such that the reflecting surfaces 25a of the reflectors 25 face each other, the light beams emitted from the two light emitting units 20 intersect each other. In the present exemplary embodiment, since two light emitting units 20 are arranged such that the reflecting surfaces 25a of the reflectors 25 are positioned back to back, the emitted light beams from the two light emitting units 20 do not intersect each other.

Also, in the present exemplary embodiment, when the elliptical shape of each reflecting surface 25a is designed such that the irradiation angle θ from one light emitting unit 20 becomes 55°, a horizontal irradiation angle of total 110° may be obtained by combining two light emitting units 20. Further, the irradiation angle of each light emitting unit 20 may be changed easily by changing the elliptical shape of the reflecting surface 25a.

Figure 9:
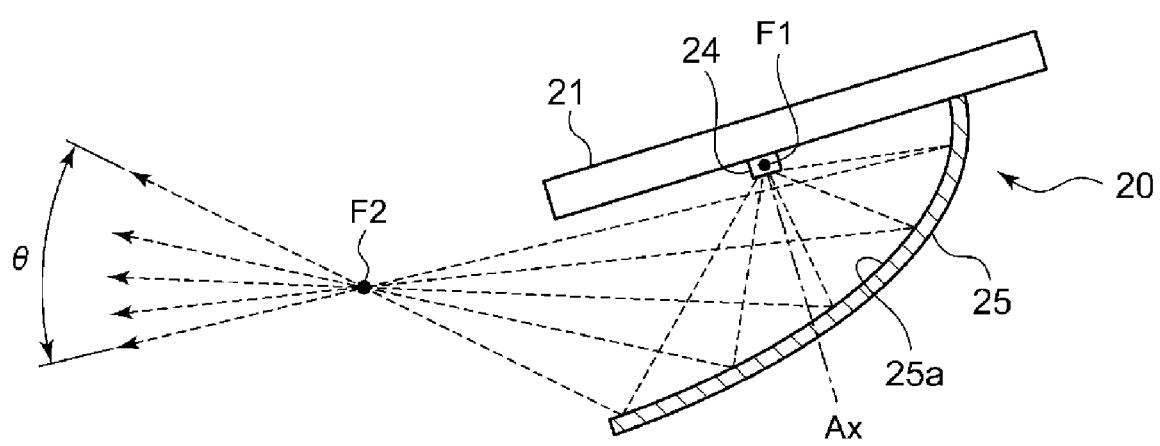
FIG. 9 is a view illustrating an aircraft position light according to another exemplary embodiment of the present disclosure.

FIG. 9 is a view for describing the aircraft position light of another exemplary embodiment of the present disclosure. FIG. 9 illustrates a horizontal cross-section of a light emitting unit 20.

In the present exemplary embodiment, as illustrated in FIG. 9, light beams are emitted in the horizontal direction by using one light emitting unit 20 rather than combining two light emitting units 20. The basic configuration of the light emitting unit 20 is the same as that of the previous exemplary embodiment. However, in the present exemplary embodiment, in order to meet the standards of the irradiation angle, it is required to shorten the distance between the first focus F1 and the second focus F2 so as to increase the irradiation angle θ.

According to the present exemplary embodiment, since the number of light emitting units 20 may be reduced, the costs of the aircraft position light 10 may be reduced.

In the above-described three exemplary embodiments, the reflecting surface 25a of each reflector 25 has an elliptical shape in a cross-section parallel to the optical axis Ax of the reflecting surface. However, the shape of the reflecting surface 25a in the cross-section parallel to the optical axis Ax is not limited to an elliptical shape and may be an arbitrary shape as long as it is a condensing-diffusing shape which condenses the reflected light beams and then diffuses the light beams to the front. The reflecting shape of the reflecting surface 25a may be, for example, a curved surface which makes sections of the reflecting surface have different focuses on the optical axis in front of the reflecting surface, respectively, (that is, the reflecting surface has a focus group).

Also, in the above-described three exemplary embodiments, lamps according to the exemplary embodiments have been described with reference to aircraft position lamps as examples. However, the lamps according to the exemplary embodiments of the present disclosure may be applied, for example, to a ship rather than exclusively applied to an aircraft.

In the above-described exemplary embodiments, an LED has been exemplified as a light source. However, the light source is not limited to the LED as long as it is a semiconductor light emitting element. For example, a semiconductor laser may be used.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A lamp comprising:
    a plurality of light emitting units each including a semiconductor light emitting element and a reflector having a reflecting surface that reflects light from a corresponding semiconductor light emitting element,
    wherein the reflecting surface of the reflector is formed to have a parabolic shape in a cross-section perpendicular to an optical axis of the semiconductor light emitting element and to have a condensing-diffusing shape in a cross-section parallel to a plane including the optical axis of the semiconductor light emitting element and a symmetry axis of the parabolic shape so as to condense and diffuse reflected light beams in a forward direction.

2. The lamp of claim 1, wherein two light emitting units are provided to be disposed in a substantially horizontal direction of the lamp, and
    the two light emitting units are arranged such that the reflecting surfaces of respective reflectors face each other.

3. The lamp of claim 1, wherein two light emitting units are provided to be disposed in a substantially horizontal direction of the lamp, and
    the two light emitting units are arranged such that the reflecting surfaces of the reflectors are positioned back to back.

4. The lamp of claim 1, wherein the plurality of light emitting units are provided to be disposed in a substantially vertical direction of the lamp.

5. The lamp of claim 2, wherein the plurality of light emitting units are provided to be disposed in a substantially vertical direction of the lamp.

6. The lamp of claim 3, wherein the plurality of light emitting units are provided to be disposed in a substantially vertical direction of the lamp.

7. The lamp of claim 1, wherein the condensing-diffusing shape is an elliptical shape.

8. The lamp of claim 2, wherein the condensing-diffusing shape is an elliptical shape.

9. The lamp of claim 3, wherein the condensing-diffusing shape is an elliptical shape.

10. The lamp of claim 4, wherein the condensing-diffusing shape is an elliptical shape.

* * * * *